United States Patent [19]

Williams

[11] Patent Number: 4,578,571

[45] Date of Patent: Mar. 25, 1986

[54] PORTABLE BAR CODE SCANNING DEVICE AND METHOD

[75] Inventor: Richard E. Williams, Lake Mary, Fla.

[73] Assignee: Numa Corporation, Lake Mary, Fla.

[21] Appl. No.: 551,672

[22] Filed: Nov. 14, 1983

[51] Int. Cl.[4] ............................................... G06K 7/10
[52] U.S. Cl. ..................................... 235/472; 235/469
[58] Field of Search ................................ 235/472, 469

[56] References Cited

U.S. PATENT DOCUMENTS 3,976,973  8/1976  Martin ............................ 235/472 X

*Primary Examiner*—Harold I. Pitts

[57] ABSTRACT

A compact, portable bar code scanner employing as a light source a light-emitting diode consumes extremely low input power. The scanner, which detects the reflectances from bars and spaces of the bar code symbol, uses optical beam-shaping methods to attain a large depth-of-focus for a non-laser system. A shaped illuminating light beam is caused to blink when the symbol is outside the depth-of-focus range and a signature imposed upon the light beam enables the scanner to substantially reject light interference. A scanning version employs an optical assembly mounted upon a bimorph leaf spring that is caused to vibrate at its natural mechanical resonance. The scanner operates with bar code symbols responsive to red light and is of sufficiently low weight to be easily hand-held.

12 Claims, 5 Drawing Figures

PORTABLE BAR CODE SCANNING DEVICE AND METHOD

FIELD OF THE INVENTION

This invention relates generally to bar code scanners and more specifically to a portable hand-held scanner employing a solid-state light source. Still more specifically, this invention relates to a compact, rugged, very low power consumption, lightweight hand-held assembly that provides a signature-carrying light beam and an optical detecting system capable of exclusively recognizing reflections from the light beam over a large depth-of-focus. Since the invention does not rely upon highly collimated light such as that from a laser, it avoids the complexity, cost, and in some cases hazardous, characteristics of laser devices frequently employed for bar code scanning.

DESCRIPTION OF THE PRIOR ART

Bar code symbols have become widely used in many industries such as grocery and food processing, industrial inventory tracking, document control, and many additional tasks. Various bar code readers and laser scanning systems have been developed to scan and decode symbol patterns and generate multiple digit representations to be used typically as inputs to computers for automatic processing. Bar codes currently comprise the most error-free method of manually entering data into a computer.

Bar code readers tend to fall into three categories. The first is the low-priced contact wand in which a pen-like device is provided with a light source and photodetector and is dragged across the bar code symbol in a manner that enables the detector to sense changes in zonal reflectances between bars and spaces. The contact wand suffers from difficulties when attempting to scan compliant or irregular surfaces. It additionally is unable to read a symbol that may be located to the rear of a transparent window, for example.

A second major category of bar code scanners is comprised of laser beam systems in which the beam is focused to a fine spot and caused to traverse the bar code symbol. Receiver collection optics that may roughly track the laser beam sense the reflections from the bar code symbol and, after appropriate conditioning and processing, produce an output signal. Laser beam systems are relatively costly and impose biological hazards if not protected, but they are widely used because of their excellent depth-of-focus.

The third category includes a variety of non-contact scanners employing gaseous or incandescent light sources that flood the symbol with light at close range. Imaging receiving optics that sometimes use self-scanning photodetector arrays scan the illuminated symbol and produce an output. Such scanners typically consume substantial energy, are generally costly, and do not meet requirements for convenient portability when the power supply is included.

One of the major problems confronting non-contact scanners is interference due to sunlight or room illumination. The scanner must sense the contrast ratio between bars and spaces on the bar code symbol, and such interfering light tends to wash out the symbol pattern. It has accordingly become customary in the receiving optics to utilize optical filters that are matched to the spectral radiation from the illumination beam. Such filters are not completely effective, and in almost all current systems special precautions against ambient light must be provided during use.

Additional problems encountered in non-contact bar code readers relate to transient effects stemming from reflectances surrounding the symbol being scanned. Current readers often have difficulty in accommodating situations wherein a 'white' symbol may be darker than the background, for example. In many cases patterns outside of the symbol can drastically affect reading accuracies.

Hand-held laser scanners have been developed to approach the portability of contact wands while avoiding the necessity for symbol contact. A typical helium-neon laser requires an input power of 10 watts or more, and thus such hand-held scanners cannot be considered direct replacements for contact wands whose input power requirements are typically less than $\frac{1}{2}$ watt. The total size and weight must also substantially exceed those of a contact wand. A number of battery-operated computer terminals in widespread use, for example, can provide adequate power for a contact wand but not for a hand-held laser scanner. In such cases the laser scanner must be rigged to an independent power source at considerable inconvenience.

Present solid-state lasers require highly stabilized power sources, and much of their compactness and efficiency is offset by ancilliary circuit requirements. Higher power units also characteristically radiate in the infrared region, an invisible region to which many ink dyes are transparent. Consequently, solid-state lasers presently exhibit a number of features undesirable for bar code scanning.

OBJECTS OF THE INVENTION

Accordingly, it is an object of this invention to provide a novel method of scanning a bar code symbol in a non-contact fashion while consuming very low input power.

Another object of this invention is to provide a hand-held bar code scanner that is substantially immune to ambient light interference effects.

Still another object of this invention is to provide a very lightweight hand-held bar code scanner suitable for direct replacement for a contact wand.

Yet another object is to provide a bar code scanner whose reading depth-of-focus is signified by a visually blinking light source.

Still another object is to provide a novel optical arrangement in a bar code scanner that provides a substantially constant signal level over an extended depth-of-field.

Yet another object is to provide a bar code scanner capable of accommodating a large range of bar code symbol sizes.

Still another object is to provide a non-laser bar code scanner whose radiated light spectrum closely matches that of a helium-neon laser, but is not biologically hazardous.

Yet another object is to provide a method of bar code scanning that avoids transient response characteristics that can impair reading accuracies.

Still another object is to provide an optical scanner having a receiving telescope and transmitting light source assembly whose common field of view is repetitively swept across a bar code symbol by mechanically vibrating the assembly at its natural resonance.

These and other objects of the invention will become apparent from the following description when taken in conjunction with the accompanying drawings wherein.

DETAILED DESCRIPTION OF THE INVENTION

Broadly speaking, the present invention employs a high intensity light-emitting diode (LED) and appropriate optics to flood with light a small area of a bar code symbol that is simultaneously being examined by a telescope-mounted photodetector. Both transmitting and receiving optics are rigidly affixed to a common platform. The high optical resolution needed for reading fine bars in the symbol is provided by the telescope/detector which accurately tracks the illumination beam from the LED. Optical demands are thus lessened for the illuminating beam, and the beam need not be of the defraction-limited form typically demanded of laser scanners.

Figure 1:
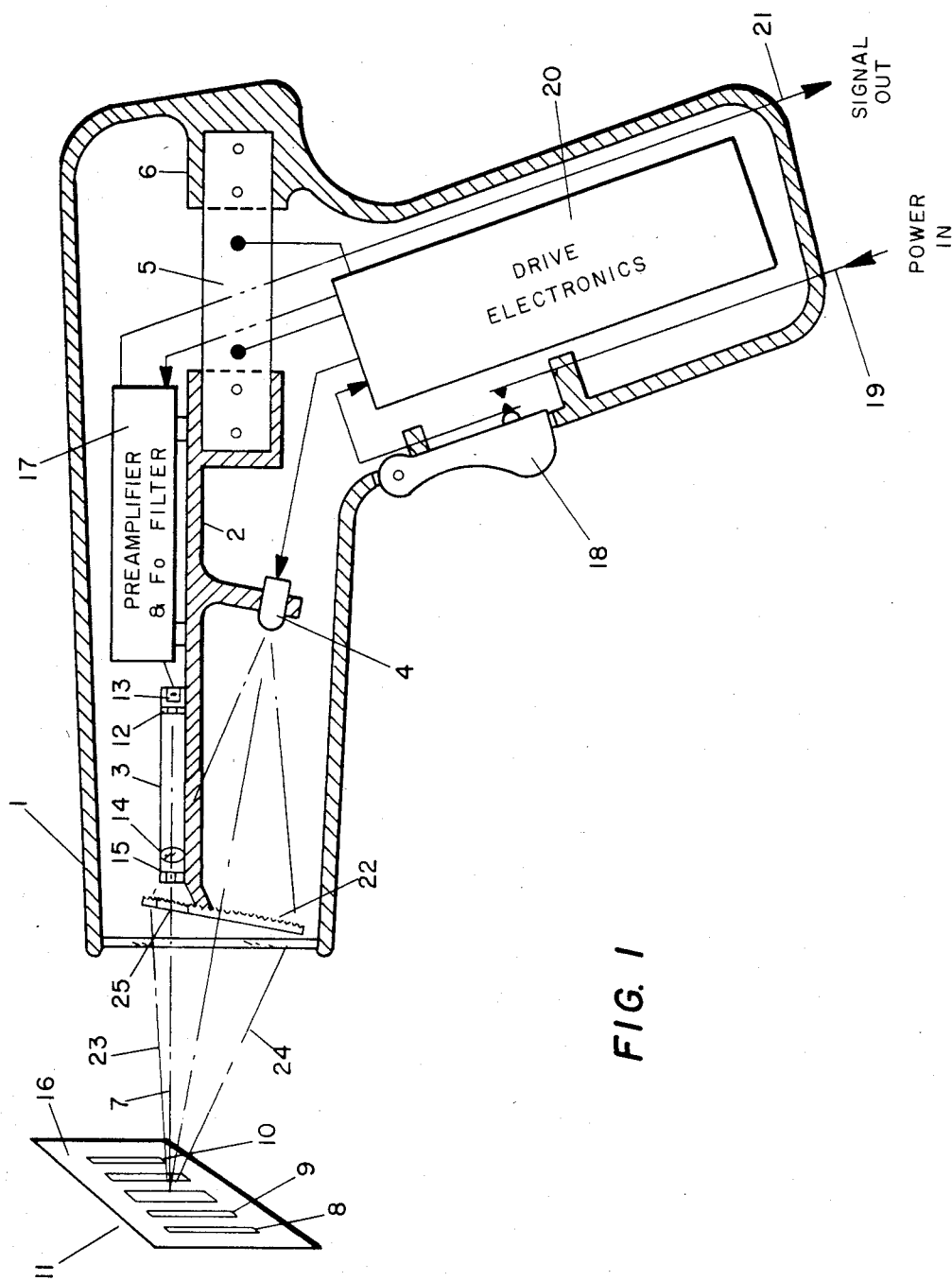
FIG. 1 is a side sectional view of a gun-shaped embodiment of a bar code scanner in accordance with this invention.

Turning now more specifically to the drawings, FIG. 1 is a side-sectional view of a gun-shaped embodiment of the elements of the invention. Housing 1, which may be injection-molded from a suitable plastic, contains an optical assembly 2 upon which are mounted receiving telescope assembly 3, transmitting light source 4, and preamplifier 17. The entire optical assembly 2 is affixed to bimorph leaf spring 5 whose far end is anchored to housing support 6. The action of bimorph 5 (a sandwich of piezoelectric and metal substrates) serves to wobbulate the optical axis designated by light ray 7 in a horizontal direction so as to enable the optics to scan bars 8, 9, 10 imprinted on bar code symbol 11. The scanning process enables any zone of symbol 11 illuminated by light source 4 to be simultaneously imaged by telescope lens 14 upon aperture 12 and photodetector 13.

In a simpler version of the invention, optical assembly 2 can be fixed mounted to case 1, and bimorph 5 eliminated. In that case, when the entire scanner of FIG. 1 is held by a user in the manner of a pistol, scanning can be imparted by wrist or forearm action causing optical axis 7 to traverse bar code symbol 11.

Aperture 15 in close proximity to imaging lens 14 stops down the receiving telescope and improves depth-of-focus. Aperture 12 in close proximity to photodetector 13 restricts the field-of-view of telescope assembly 3 to a zone dimensionally roughly equal to the smallest bar width incorporated in symbol 11. Condensing lens 22 concentrates the light from source 4 into a zone closely surrounding and tracking the intersection of optical axis 7 and symbol 11. Accordingly, as symbol 11 is scanned by assembly 2 the electrical output from photodetector 13 will carry a modulation component comprising a temporal representation of the bar code pattern imprinted on symbol 11.

Pattern bars 8, 9, 10 are conventionally printed in a manner that causes them to exhibit a substantial departure in reflectance from that of symbol background 16. If, for example, the light emitted by light source 4 were of dominantly red hue, bars 8, 9, 10 could be black or green against a white or red background to provide a high contrast detectable by photodetector 13. If the bars were red against a white background, on the other hand, the energy from light source 4 would be well reflected by both bars and background, and little contrast would be observed. Specifications for widely used bar code symbols have been based upon scanner designs that use light from helium-neon lasers. That light is red in hue and spectrally peaks at approximately 630 nm. In order to insure compatibility with the large population of symbols in existence, the preferred radiated hue from light source 4 is at approximately that spectral wavelength. A number of light-emitting diodes (LED's) produce such light at high efficiency. Accordingly, an LED is the preferred light source 4.

A significant problem encountered by bar code scanners is created by interfering ambient light that can reflect from the surface of symbol 11. The interference can stem from sunlight which produces a steady or DC component in the electrical output of photodetector 13, and which can also produce shot or photon noise at the photodetector output. Another major source of interference stems from incandescent or fluorescent lamps that generate strong modulation components at multiples of the power line frequency. Where 60 Hz power is used, for example, very strong components at 120 Hz and multiples thereof can be reflected into the system. In the present invention such interference effects are substantially eliminated by modulating light source 4 at a frequency well above the interference effects, typically 10 KHz or above. The electrical output of photodetector 13 can then be high-pass filtered so as to reject substantially all detected light not carrying the modulating signature. Amplification, filtering and other signal processing are provided by electrical module 17.

A trigger switch 18, when actuated by the user, connects power derived from an external source via bus 19 to the electronic drive for light source 4. Thus when the trigger 18 is not actuated very little power consumption occurs and, if the primary power source is a battery for example, battery life is substantially extended. When trigger 18 is actuated, a signature carrier generator located within drive electronics 20 excites light source 4 with current pulsating at the signature frequency. If, within the field-of-view of telescope 3, the symbol 11 produces high reflectance, the carrier component is observed at the output of photodetector 13 and an output signal is produced on output bus 21. If the field-of-view of telescope 3 falls within a substantially non-reflecting portion of symbol 11, little or no output is observed on output bus 21. Thus, as the bar code symbol 11 is scanned, output bus 21 provides an electrical temporal representation of the bars that is substantially devoid of interference. The data encoded in the bars is thereby available for processing by an external computer.

In the case of the scanning embodiment of the invention; i.e., where optical assembly 2 is wobbulated by bimorph 5, drive electronics 20 contain an oscillatory circuit that serves to wobbulate bimorph 5 at a frequency typically falling between 5 and 30 Hz. Since a pair of symbol scans, left to right and right to left, are produced for each cycle of bimorph drive, the symbol is scanned at a rate typically falling between 10 and 60 scans per second.

METHOD OF OBTAINING A LARGE DEPTH-OF-FOCUS

A novel method of obtaining a maximum depth-of-focus is provided by the combined action of telescope 3, lens 22, and light source 4. Lens 22, which may be of the plastic Fresnel type, acts as an optical condensor. Its focal length is chosen to cause upper ray 23 and lower ray 24 derived from light source 4 to converge to a small zone on symbol 11 located at a selected maximum throw distance from the scanner. An aperture 25 located in lens 22 enables receiving telescope 3 to properly focus without interference by lens 22. The optical axis of telescope 3 depicted by ray 7 is seen to fall within the region bounded by upper ray 23 and lower ray 24. As symbol 11 is moved toward the scanner, the field-of-view available to telescope 3 and constrained by aperture 12 falls within the illuminated region bounded by rays 23 and 24. More important, that portion of irradiance stemming from light source 4 falling within the receiver field-of-view (typically measured in watts per cm$^2$) varies roughly directly as the distance squared between the symbol and scanner. This occurs because the light energy stemming from source 4 is dispersed over larger areas as distance is reduced, whereas the very small telescope field-of-view remains essentially constant. That change of radiant intensity within the field-of-view of telescope 3 is almost precisely offset by an opposite change in energy received through telescope aperture 15 as symbol 11 is moved closer to the scanner. The latter effect is that of the well known 'inverse square law' that relates to Lambert (cosine) reflectance and finite aperture cross section.

Figure 5:
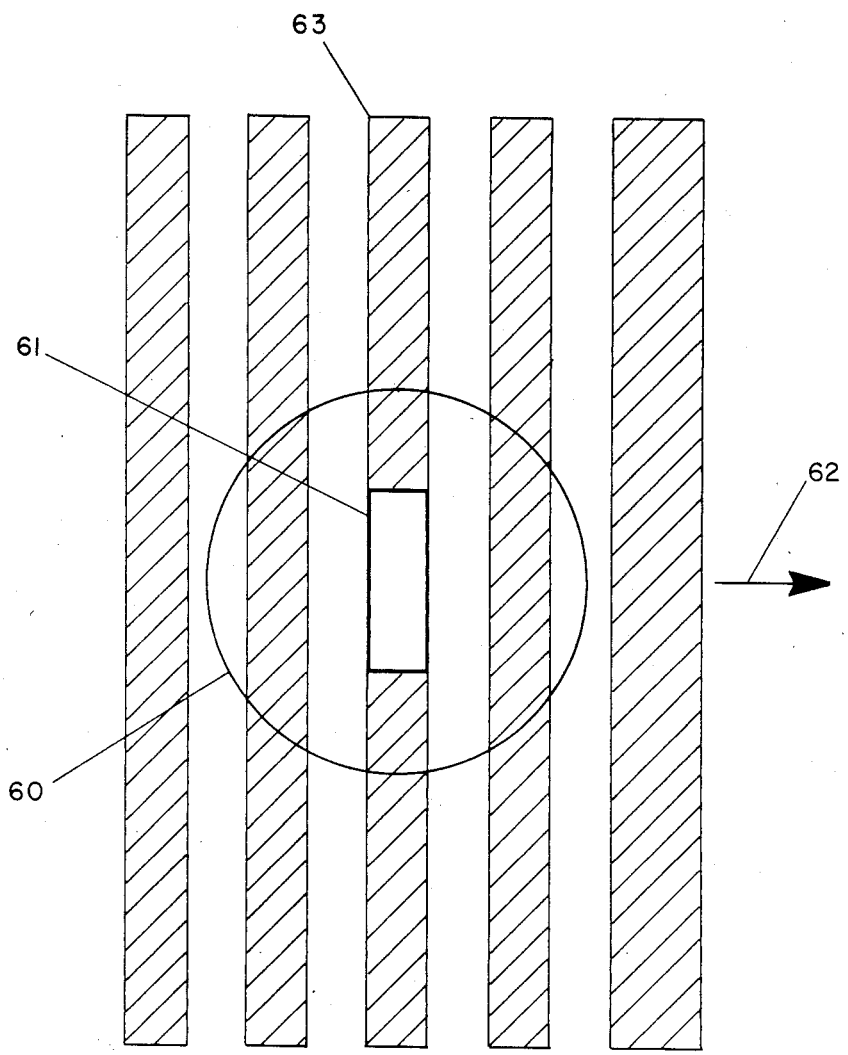
FIG. 5 is a representation of instantaneous illumination and detection zones on a bar code symbol.

A view of the zonal effect on the surface of the symbol is provided by FIG. 5. Irradiation zone 60 created by light source 4 and condensing optics 22 contains substantially all of the radiated light energy. Field-of-view 61, which may be rectangular by choice of aperture 12 shape, represents the zone observed by receiving telescope 3. Zone 61 has a dimension in the direction of scan 62 approximately equal to a narrowest symbol bar width, that of bar 63 in the figure. As the throw distance from scanner to symbol is decreased, the area of zone 60 increases but that of zone 61 remains essentially constant. Since the total light flux in 60 is constant, the flux falling within zone 61 decreases with throw distance.

The reflected flux from zone 61 obeys the cosine scatter law which means that more flux can be captured by the receiving telescope as the throw distance is decreased. The increase in captured flux tends to offset the lower flux density within zone 61. Since the available light flux is efficiently concentrated into region 60 which closely tracks zone 61, the overall optical efficiency is very high.

In summary, over a range of throw distances and within the field-of-view 61 the irradiance stemming from light source 4 increases roughly as the square of distance out to focus of lens 22 whereas the received energy decreases roughly as the square of that distance. The result is a relatively constant signal strength over a substantial depth-of-field out to a maximum throw distance established by the selected focus of lens 22.

As is well known in the optical art, the sharpness of focus with distance is basically determined by aperture 15, with greater depth-of-focus resulting from a smaller aperture. In the present invention, the diameter of aperture 15 can be in the order of 1% of the maximum throw distance required. The novel method of providing spatially overlapping regions for light source and receiving optics, substantially cancelling optical gains for transmitting and receiving powers, and employing a highly stopped-down receiving telescope provides an unusually large depth-of-focus for a non-laser system.

SCANNING METHOD AND DEVICE

Figure 2:
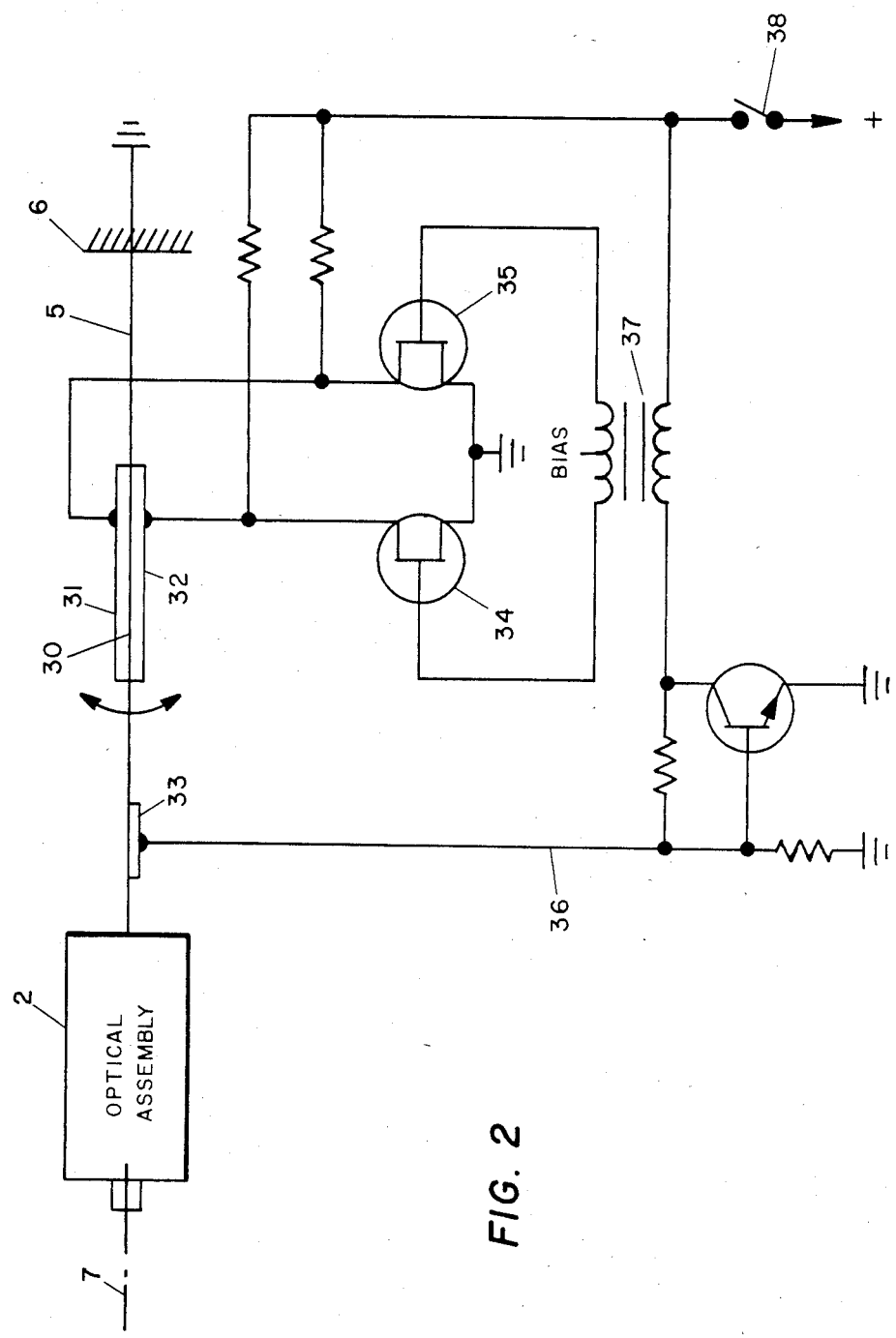
FIG. 2 is a diagram of a piezoelectric bimorph scanning device providing a reciprocating sweep of an optical axis.

In the scanning version of the present invention, optical assembly 2 of FIG. 1 is caused to vibrate horizontally at a natural resonant frequency via action of bimorph leaf spring 5. Referring to FIG. 2, the bimorph itself is viewed as a top view of FIG. 1, and is comprised of a metallic substrate 30 to which are bonded a pair of piezoelectric elements 31, 32. Elements 31, 32 longitudinally expand when subjected to an electric potential of one polarity and contract when excited by the opposite polarity. When elements 31, 32 are driven by out-of-phase electric potentials, the expanding element causes leaf spring 30 to bend away from that element in a convex manner. The contracting element, on the other hand, produces a concave stress. Accordingly, the two opposing elements cause leaf spring 30 to bend in accordance with the applied electrical potentials.

An independent piezoelectric element 33 bonded to leaf spring 5 produces a voltage when stressed by the leaf spring. Thus, as leaf spring 30 is caused to vibrate by piezoelectric elements 31, 32, element 33 produces an output voltage whose envelope corresponds to the stresses invoked.

When piezoelements 31 and 32 are excited in push-pull fashion by solid state components 34, 35 which may be of the MOSFET type, and the latter components are driven via bus 36 by the electric potential produced by element 33, a closed loop is created. When the closed loop phase shift is properly selected by choice of polarities on transformer 37, for example, and sufficient gain is provided in the loop, the entire loop will break into oscillation at a frequency substantially dictated by the mechanical resonance of the system. The frequency is selected by choice of spring 5 elastic modulus to fall typically between 5 and 30 Hz.

It is well known that very little energy is required to excite and maintain a high Q resonant oscillation. The arrangement of FIG. 2 accordingly provides an extremely efficient means for scanning a bar code symbol. As an example, an optical assembly weighing approximately two ounces can be scanned at a 5 Hz rate to more than ±20° of leaf spring deflection at a total input power consumption of 20 mw or less. Additional advantages of the novel method described include extremely low frictional losses (contributing to a very high Q) and a single degree of freedom firmly constrained to a single axis.

Although a bimorph circuit was described and shown in FIG. 2, a monomorph can also operate satisfactorily. Monomorph operation results when one of the two driving piezoelectric elements 31, 32, is eliminated and all excitation is applied to a single side of leaf spring 30. In that case, merely a single-ended drive (as opposed to push-pull) is required, but all of the energy must be provided to the single driven element.

In some cases such as when a very large bar code symbol is encountered, it is desirable to defeat the automatic scanning circuit of FIG. 2 and utilize the scanner of FIG. 1 in a manual mode. The preferred method is to simply disable the circuit of FIG. 2 by selectively removing power. This can be accomplished by switch 38 which operates independently of the trigger power switch 18 of FIG. 1. Switch 38 can be located at any appropriate point on housing 1 of the scanner. When the circuit of FIG. 2 is de-energized, optical assembly 2 is oriented at the minimum stress position assumed by leaf spring 5, typically at midpoint.

SIGNAL PROCESSOR

Figure 3:
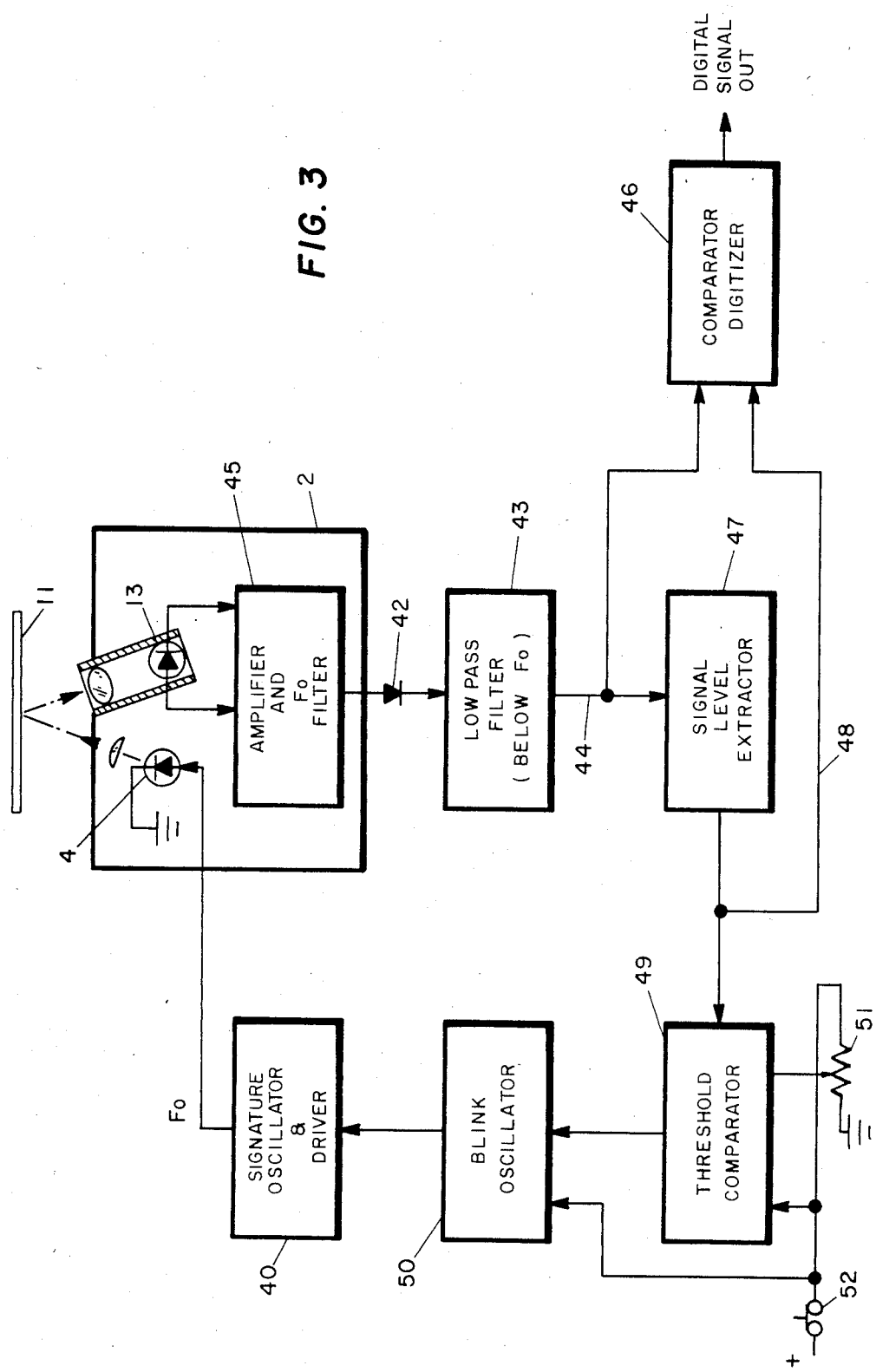
FIG. 3 is a basic block diagram of a signal processing device constructed according to the invention which is suitable for carrying out the novel operating and signal processing features disclosed.

The electronic circuits of FIG. 1 are functionally depicted in FIG. 3. When light source 4 is energized, it is gated on and off rapidly at a carrier frequency $F_o$ derived from signature oscillator 40. The carrier frequency $F_o$ may have any value distinguishable from interferring light source modulations. In practice, any frequency above 1000 Hz or so is relatively free from interference. As a bar code symbol is scanned, however, frequency components defined by the Fourier spectrum of the scanned pattern may occur at 1 KHz or higher. They can force the choice of a higher carrier frequency.

If conventional carrier demodulation techniques were employed, the scanner receiving circuits would tune to the carrier frequency, invoke demodulation, and then low-pass filter the detected signal to provide a replica of the scanned pattern. The post detection low-pass filter; i.e., the one used to extract the baseband signal, must cut off at a sufficiently low frequency to avoid carrier feedthrough. If a very high carrier frequency were utilized, little or no difficulty in separating the carrier components from the baseband would be encountered. Unfortunately, currently available solid-state photodetectors suffer serious degradations in output signal levels at higher modulation frequencies. The losses stem from intrinsic capacities in the detectors. Attempts to reduce the effects via photoconductive configurations lead to noise increases. Inasmuch as the response of a photodetector typically drops off at the rate of 6 db per octave and very high sensitivity is desired in a scanner, the carrier frequency should be chosen to be as low as possible.

Figure 4:
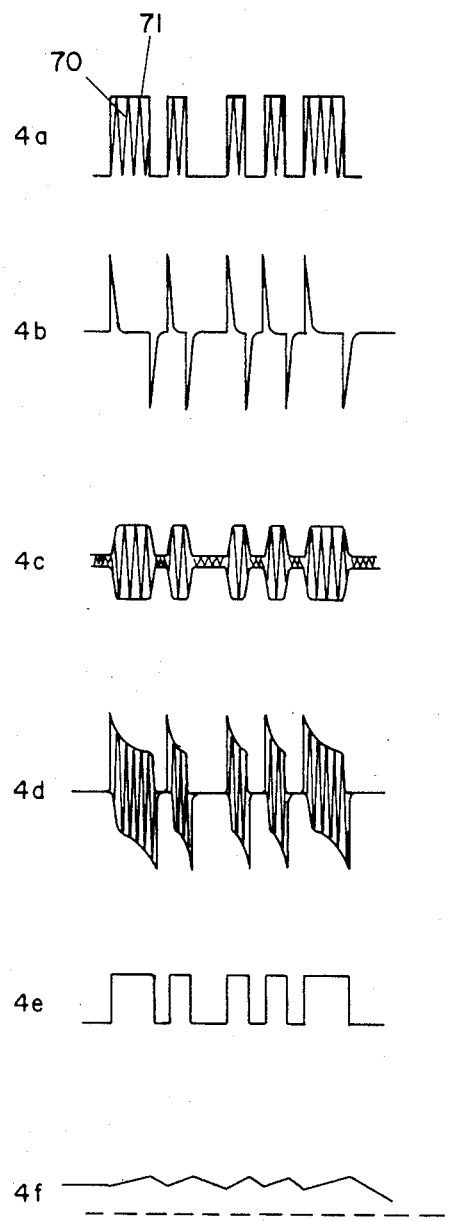
FIG. 4 is a graphic representation of waveforms corresponding to a signal being processed via the circuits of FIG. 3.

The present invention not only is able to use a very low carrier frequency, but also exploits baseband interference to attain superior operation. Referring to FIG. 4, waveform 4a is an idealized representation of the reflected signal from a bar code symbol. More specifically, it represents modulated reflectance plotted as a function of time as the scan progresses. The carrier component 70 has an envelope 71 responsive to bar code data. After passing through a highpass filter, the waveform of 4a can conveniently be divided into two components corresponding to 4b and 4c. 4b is the differentiated component of the baseband or envelope. 4c represents the true carrier component after all baseband energy has been removed. Assuming for expository purposes that a typical scanning rate were to produce a bar rise time in the vicinity of 200 microseconds, 4b would be representative of baseband frequency components in the vicinity of 3 to 5 KHz. It is always possible to calculate the spectral region containing components such as 46 if the scan rate and optical resolution are known.

When a highpass filter capable of transmitting the frequency components of both 4b and 4c is provided in the system, a composite waveform such as 4d is observed at the output of the filter. 4d is simply the summation of 4b and 4c. The waveform of 4d is particularly attractive for use in bar code scanning inasmuch as it tends to sharpen the rise and fall times of the symbol-derived waveform. Since the data contained in bar code symbology is dependent upon precise measurement of the bar edges, the novel technique of combining higher baseband components with carrier components serves to enhance bar code reading accuracy.

As a reflective symbol is scanned the waveform of 4d is provided by amplifier and filter 45 of FIG. 3. When passed through detector 42 and lowpass filter 43, the bar code replica signal of 4e is obtained on bus 44. Amplifier and filter 45 is of a conventional a-c coupled type in which the cutoff frequency is chosen to pass only baseband component 4b and carrier component 4c as described. The action of the highpass filter also serves to reject low frequency interferences stemming from fluorescent lamps, etc.

All bar code scanners must at some point render a binary decision as to whether the reflectance from a symbol represents a bar or background. Depending upon the nature of signal processing, the accuracy of such decisions can vary widely. The received energy level at the scanner photodetector may be extremely low, in the order of $10^{-11}$ watts or less. High gain and sensitivity requirements in the input signal processing circuits demand a-c coupling in order to avoid d-c offset problems inevitably introduced by circuit drifts.

If a conventional non-carrier method is employed and the a-c coupling time constants are short, both high- and low-reflectance baseband signals discharge to a common level where noise is able to change apparent states and create decoding errors. If a-c time constants are long, low or high-reflectance regions outside of the symbol can induce recovery effects that influence decision thresholds. It is entirely possible, for example, for a 'white' symbol to actually be darker than a highly reflecting surrounding surface. Any sluggish threshold adjustment will inevitably lead to decoding errors.

When a carrier is utilized as in the present invention, short time constant a-c decoupling can be employed in the input circuits to avoid d-c offsets. Since a zero-frequency baseband component is carried by the unmodulated carrier, there is no tendency for symbol reflectance levels to shift as a result of transient responses. In post-detection circuit 43 where signal levels are high and d-c offsets are irrelevant, d-c coupling can be employed. Thus the entire system of FIG. 3 is relatively immune to the serious transient problems that plague conventional bar code scanners.

The signal on bus 44 is further processed by signal level extractor 47 which conventionally consists of a rectifier and signal averaging filter. Its output on bus 48 is depicted by FIG. 4f, and is a voltage level that tends to track an averaged signal amplitude. Waveform 4f on bus 48 and waveform 4e on bus 44 are combined in comparator-digitizer 46 to provide a standardized bipolar output signal. In essence, whenever waveform 4e exceeds that of waveform 4f the output of comparator 46 goes high. The output of comparator 46 is low otherwise. The tracking action of comparator 46 is widely used in bar code scanners and is not considered novel to the present invention.

In a simpler embodiment of the invention, the automatic scanning feature produced by the circuit of FIG. 2 can be omitted. In that case the hand-held scanner must be manually swept across the symbol to collect data. As a convenience in ascertaining whether the signal is within the scanner's depth-of-focus, the output of signal level extractor 47 is passed through threshold device 49 to disable blink oscillator 50. Device 49 simply compares a fixed voltage level provided by potentiometer 51 with the signal level at extractor 47 output. An output is obtained from threshold 49 only if the signal level is high enough to indicate that a reflecting surface is within the appropriate scanner range.

Blink oscillator 50 may use a type 555 oscillator/timer integrated circuit to produce an output squarewave at a visually-discernable selected blink frequency in the vicinity of one to five Hz. When the threshold of comparator 49 is exceeded, oscillator 50 is de-energized. On the other hand, when the threshold of comparator 49 is not exceeded; i.e., an inadequate signal is present, blink oscillator 50 modulates LED oscillator/driver 40 at the blink rate. Oscillator 40 may also be of the 555 IC type configured to oscillate at the signature frequency when enabled. It is enabled steadily when blink oscillator 50 is disabled, and thus produces a visually steady signal when a symbol is within the focus range. The blinking of the light source indicates to the user that a usable signal is not being developed: i.e., a symbol or reflecting surface is not within the required depth-of-focus. The novel method of blinking the light when out of range enables the user to sense that condition while naturally watching the illuminated spot.

The depth-of-focus indicator comprised of elements 49, 50, and 51 of FIG. 3 can be selectively disabled if the user simply chooses to approach the symbol while scanning and thus pass through the proper focus region automatically. Switch 52, which may be ganged with switch 38 of FIG. 2, provides the disabling function by removing power from one or more of the blink function components as shown in FIG. 3.

While the invention has been particularly shown and described with reference to preferred embodiments thereof, it will be understood by those skilled in the art that various changes in form and details may be made therein without departing from the spirit and scope of the invention.

What is claimed as new and desired to be protected by Letters Patent is set forth in the appended claims.

I claim:

1. A device for measuring at a variable throw distance the reflectance of a zone in a bar code symbol, comprising:
   a housing normally supportable by a user at said variable throw distance from said symbol;
   an optical assembly attached to said housing by coupling means;
   a light-emitting diode affixed to said assembly for providing a radiant light beam of constant average energy;
   optical condensing means affixed to said assembly for directing said radiant light beam to intersect said zone;
   telescope means affixed to said assembly and having a field-of-view falling within the intersection of said radiant beam and said zone: and
   sensor means affixed to said telescope means for detecting the intensity of reflected light within said field-of-view and for generating an electrical signal indicative of said intensity, whereby said signal characterizes said measurement.

2. The device of claim 1 wherein said housing is substantially handgun-shaped.

3. The device of claim 1 wherein said radiant light beam is of red hue.

4. The device of claim 1 wherein over a predetermined throw distance range said optical condensing means shapes said radiant beam to provide upon said symbol within said field-of-view an irradiance that varies substantially as the square of said variable throw distance.

5. The device of claim 1 further comprising:
   a signature oscillator operating at a frequency in excess of 1 KHz;
   means responsive to said oscillator for controlling the radiant intensity of said light-emitting diode: and
   filtering means operative upon said electrical signal to substantially remove frequency components below 1 KHz.

6. The device of claim 1 wherein said coupling means comprises:
   a piezoelectric bimorph leaf spring;
   a piezoelectric sensor mounted on said spring and having no more than one electrical terminal in common with said bimorph;
   an electrical amplifier responsive to the electrical output of said piezoelectric sensor; and
   means coupling said amplifier to said bimorph whereby a closed loop is created and said spring is caused to vibrate.

7. The device of claim 6 wherein at least one element of said combination is controllably de-energized by a switch mounted on said housing.

8. The device of claim 1 wherein said coupling means comprises:
   a piezoelectric monomorph leaf spring;
   a piezoelectric sensor mounted on said spring and having no more than one electrical terminal in common with said monomorph;
   an electrical amplifier responsive to the electrical output of said piezoelectric sensor; and
   means coupling said amplifier to said monomorph whereby a closed loop is created and said spring is caused to vibrate.

9. The device of claim 8 wherein at least one element of said combination is controllably de-energized by a switch mounted on said housing.

10. The device of claim 1 further comprising:
    electrical averaging means responsive to said electrical signal;
    threshold means responsive to said averaging means;
    blinking oscillator means responsive to said threshold means; and
    modulation means responsive to said blinking oscillator means for controlling the intensity of said radiant light beam.

11. A method for indicating at a distance the reflectance of a zone in a bar code symbol comprising the steps of:
    irradiating an area of said symbol encompassing said zone with a predetermined-energy radiant light beam;
    shaping said beam to force its cross-section area transverse to distance to vary substantially inversely with distance; and
    detecting at said distance through a fixed aperture the reflected light within a substantially constant field-of-view contained within said zone, whereby the detected amplitude is indicative of said reflectance.

12. A device for characterizing at a distance the reflectance of a zone in a bar code symbol comprising:
   a housing positioned said distance from said symbol;
   an optical assembly attached to said housing by coupling means;
   a light-emitting diode affixed to said assembly to provide a radiant light beam of constant average energy;
   beam controlling means to shape said beam's cross-section area transverse to distance to vary substantially inversely with said distance, and to direct said beam to irradiate on area of said symbol that encompasses said zone;
   telescope means having a fixed aperture stop and a field-of-view falling within said zone; and
   detector means affixed to said telescope means for detecting the intensity of reflected light within said field-of-view and for generating an electrical signal indicative of said intensity, whereby said signal characterizes said reflectance.

* * * * *